(12) United States Patent
DeGroat et al.

(10) Patent No.: US 7,170,704 B2
(45) Date of Patent: Jan. 30, 2007

(54) ENHANCED DIBIT EXTRACTION

(75) Inventors: Ronald D. DeGroat, Lakewood, CO (US); William Bliss, Thornton, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 307 days.

(21) Appl. No.: 10/877,715

(22) Filed: Jun. 25, 2004

(65) Prior Publication Data

US 2005/0286151 A1    Dec. 29, 2005

(51) Int. Cl.
    *G11B 5/09*    (2006.01)
(52) U.S. Cl. .......................... 360/53; 360/46
(58) Field of Classification Search ..................... None
    See application file for complete search history.

(56) References Cited

U.S. PATENT DOCUMENTS

| | | | |
|---|---|---|---|
| 6,208,477 B1 * | 3/2001 | Cloke et al. .................. 360/31 |
| 6,292,912 B1 | 9/2001 | Cloke et al. | |
| 6,636,372 B1 * | 10/2003 | Nguyen et al. ............... 360/31 |
| 6,639,748 B1 | 10/2003 | Christiansen et al. | |
| 6,731,443 B2 | 5/2004 | Bliss et al. | |
| 6,788,481 B2 * | 9/2004 | Fang et al. ................... 360/31 |

OTHER PUBLICATIONS

Braun, Volker, Impulse Response Measurement of a Magnetic Recording Channel Using Golay Sequences, 6th Benelux-Japan Workshop, No Date, pp. 16.1-16.4.

Measurement Solutions for Disk Drive Design, Application Note, Tektronix, www.tektronix.com, 2002, pp. 16.

* cited by examiner

*Primary Examiner*—Wayne Young
*Assistant Examiner*—Daniell L. Negrón
(74) *Attorney, Agent, or Firm*—Lisa K. Jorgenson; William J. Kubida

(57) ABSTRACT

A method for characterizing a read channel of a disk drive by storing a pseudorandom number (PN) sequence at a first location on a recording surface of the disk drive, and storing the PN sequence at a second location on the recording surface. The PN sequence at the first location is read to generate a first playback signal, and a first dibit response is determined from the first playback signal. The PN sequence at the second location is read to generate a second playback signal, and a second dibit response is determined from the first playback signal. The first and second dibit responses are arithmetically combined to generate a combined dibit response in which at least some non-linear echoes are isolated.

30 Claims, 7 Drawing Sheets

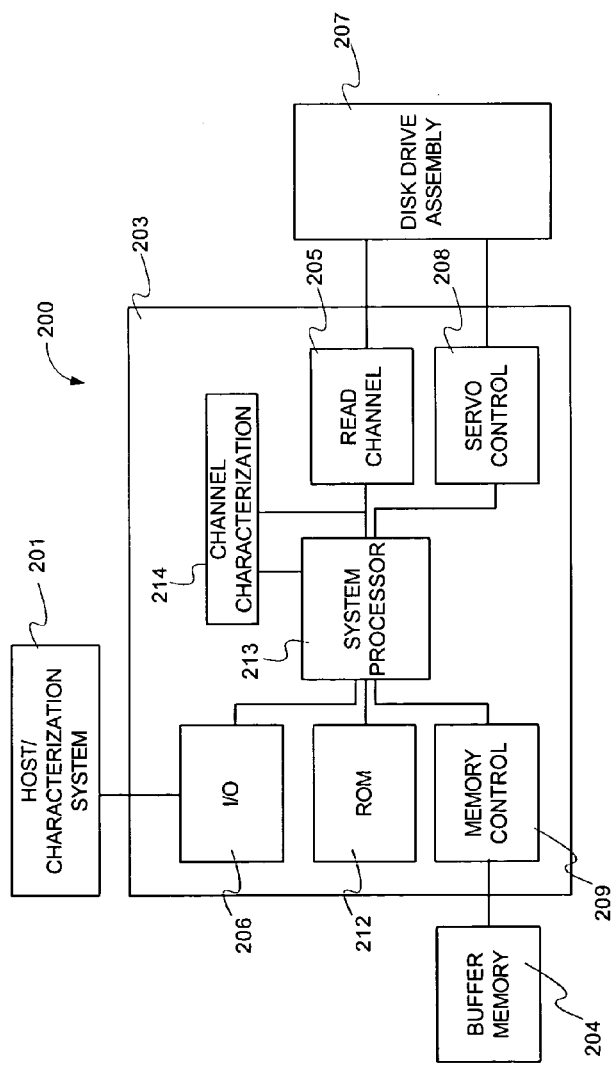
FIG. 2
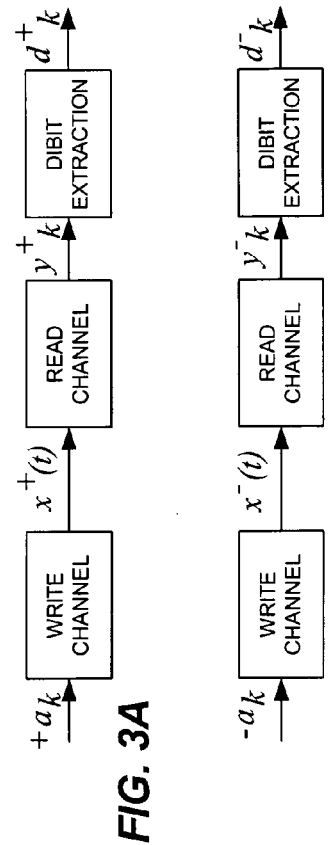
FIG. 3A
FIG. 3B

ENHANCED DIBIT EXTRACTION

BACKGROUND OF THE INVENTION

1. Field of the Invention

The present invention relates, in general, to disk data storage devices, and, more particularly, to software, systems and methods for enhanced dibit extraction to compensate for non-linearity in correction circuits of hard disk drives.

2. Relevant Background

Hard disk drives provide low cost, reliable, and large capacity data storage for computing devices ranging from familiar personal computers to network storage used in data centers. Increasingly, hard disk drives are used for data storage in a variety of appliances such as printers, televisions, set top boxes, media centers, and portable media/data storage devices. Accordingly, there is a constant need to improve performance, reliability, and capacity for hard disk storage devices.

Disk drives typically include one or more rotating platters having a magnetic surface encased within an environmentally controlled housing. One or more read/write heads read and write data to the magnetic surface. Servo mechanisms precisely control placement of the read/write heads over locations on the magnetic surface and control circuits drive the servo mechanisms to control head positioning. The read/write heads are driven by read channel circuitry which operates to generate and/or sense electromagnetic fields on the platters. The electronics encode data received from a computing device and translate the data into magnetic encodings, which are written onto the magnetic surface by the read channel circuitry. When data is requested, the servo mechanisms locate the data, sense the magnetic encodings, and translate the encodings into binary digital information.

The read/write heads detect and record the encoded data as areas of magnetic flux. The data are encoded by the presence or absence of a flux reversal between two contiguous locations of the platter. Data may be read using a method known as "peak detection" by which a voltage peak imparted in the read/write head is detected when a flux reversal passes the read/write head. Increasingly, however, a technique called partial response maximum likelihood ("PRML") is used to read/write data to the disk surface. PRML involves digitally sampling an analog "playback voltage" to determine a most-likely bit pattern represented by the analog waveform. PRML technology tolerates more noise in the magnetic signals, permitting greater manufacturing tolerances in the platters and read/write heads, which increases manufacturing yields and lowers costs.

Read channel electronics include correction circuits to compensate for these nonlinearities. In the absence of non-linear effects, the playback voltage in a hard disk drive can be described by:

$$V(t) = \sum \frac{1}{2}(a_{k+1} - a_k)h(t - kT)$$

where $a_k \epsilon (1,-1)$ represents the NRZ (Non-Return to Zero) write current, T is the bit period and h(t) is the playback voltage response to an isolated transition response. In a hard disk drive, the magnetic read/write channel induces a variety of nonlinearities that usually require some form of compensation or correction. The more accurately these nonlinearities can be characterized, the more accurately they can be compensated for, which, in turn, allows the read channel to be calibrated for improved performance.

A paper containing useful background information concerning such distortions has been authored by Palmer, D and Ziperovich, P., and is titled "Identification Of Nonlinear Write Effects Using Pseudorandom Sequences", IEEE Transactions On Magnetics, Vol. Mag-23, No. 5, September 1987, pp 2377–2379. This paper discusses linear and non-linear distortions that occur in read channels, and describes a technique for separating linear and nonlinear effects, based on the unique properties of a maximal-length pseudorandom noise sequence (a "PN sequence").

One technique described in this paper is referred to as "dibit extraction". Dibit extraction can be used to calibrate the nonlinear correction circuits used to compensate for these nonlinearities. A wide variety of measurements can also be obtained from an extracted dibit. A big advantage of dibit extraction is that it can simultaneously detect a number of nonlinear effects during the testing and calibration phase of manufacturing. Dibit extraction can also be used to estimate or minimize these nonlinear effects. In this manner dibit extraction is a technique that can perform a multitude of functions that can reduce manufacturing time and cost. However, these functions depend on extracting accurate dibit response information.

Dibit extraction involves extracting the dibit response from the playback voltage V(t). In a typical application, a maximal length pseudorandom noise (PN) sequence (also referred to as an "m-sequence") is written to disk (e.g., a 127 bit PN sequence) and then read back to obtain the playback voltage V(t). When $a_k$ is a maximal length NRZ pseudorandom sequence, then nonlinear effects are associated with various products of NRZ values, e.g., magnetoresistive (MR) asymmetry is associated with $a_k a_{k-1}$, and NLTS (non-linear transition shift) is associated with $a_{k-1} a_k a_{k+1}$. Based on the "shift and add property" of maximal length pseudorandom sequences, the nonlinear NRZ products produce echoes in the extracted dibit.

Some nonlinear products and echo locations in the extracted dibit are shown in prior art FIG. 1, and are shown in table 1 below for a length 127 maximal length pseudorandom sequence (or m-sequence) defined by:

$$x_n = x_{n-3} x_{n-7} \text{ where } x_0 = \ldots = x_6 = -1.$$

TABLE 1

(Prior art)

| Nonlinearity | Associated Nonlinear Term | Location Relative to Main Dibit Response for $x_n = x_{n-3} x_{n-7}$ with $x_0 = \cdots = x_6 = -1$ |
|---|---|---|
| NLTS, PE | $a_{k-1} a_k a_{k+1}$ | −25.5, −1.5 |
| NLTS2 | $a_{k-2} a_k a_{k+1}$ | +15 |
| HT | $a_k a_{k+1}$ | +30.5 |
| MR | $a_k a_{k-1}$, $a_{k-2}$, $a_k a_{k-3}$ | +31.5, +61, +5.5 |
| MR Sat. | $a_{k-1} a_k a_{k+1}$, $a_{k-2} a_k a_{k+1}$, $a_{k-1} a_k a_{k+2}$ | −25.5, +13.5, −44.5 |

KEY:
NLTS = Nonlinear Transition Shift
NLTS2 = NLTS from 2 Bits Periods away
PE = Partial Erasure
HT = Hard Transition
MR = Magneto-Resistance When the m-sequence, $a_k$, is deconvolved with V(t), the result is the dibit response:

$$d(t)=h(t)-h(t-T)$$

which is the response of the channel to an isolated NRZ pulse (also called a dibit because it consists of two transitions one bit width apart). Deconvolution is a process of finding the most likely input to a system, given the known properties and measured outputs of the system. In most cases, a sampled dibit response:

$$d_k=d(kT)=h(kT)-h((k-1)T)$$

is used. In the case of longitudinal recording, the main dibit response has the shape of a dipulse, as shown in FIG. 1, whereas in the case of perpendicular recording, the dibit response has the shape of an isolated pulse (not shown).

An example of a longitudinal dibit response 101 is shown in prior art FIG. 1 with some of the possible nonlinear echoes (e.g., echoes 103, 104 and 106). In FIG. 1, the vertical axis represents the amplitude of the dibit response signal in volts and the horizontal axis represents the discrete time shifts of the PN sequence. In FIG. 1, there are 127 values spread across the horizontal axis in a range of discrete time shifts (measured in bits) from between −63 bits to +63 bits. The main dibit response 101 represents the linear response of the read channel. The location of each echo is a result of "shift and add" property of the m-sequence interacting with a particular nonlinearity, hence, the location of each echo can generally be predicted. The height and polarity of each echo is related to the type of nonlinearity associated with the echo. For example, at moderate to high channel densities, the NLTS echo height 103 relative to the main dibit 101 is approximately one half the actual NLTS percentage. The shape of the echo may also indicate the origin of the echo. For example, the HT echo 104 at 30.5 is asymmetric whereas the MR echo 106 at 31.5 is symmetric.

An accurate dibit response can be used to characterize nonlinearities in the read channel and compensate for those nonlinearities. For example, write pre-compensation can be used to adjust the signal as it is written to disk so that the nonlinearities have less affect on the read data. Accurate dibit response data can be used to estimate channel pulse width parameters such as PW50 (average pulse width at 50% of peak level in a signal) and T25–75 (the transition width from 25% peak signal to 75% peak signal). Also, dibit information can potentially be used to estimate the overwrite ratio.

One problem with current dibit extraction techniques is that sometimes the nonlinear echoes interfere with each other or with the main dibit response. This occurs when a nonlinear echo occurs coincidently with (e.g., at substantially the same location as) the main dibit response or another echo to produce constructive or destructive interference. This situation makes dibit extraction based calibration and measurement less useful or inaccurate. Hence, a need exists for systems and methods for dibit extraction that overcome the limitations caused by echoes that interfere with accurate characterization of the read/write channel.

SUMMARY OF THE INVENTION

Briefly stated, the present invention involves a method for characterizing a read channel of a disk drive by storing a pseudorandom number (PN) sequence at a first location on a recording surface of the disk drive, and storing the PN sequence at a second location on the recording surface. The PN sequence at the first location is read to generate a first playback signal, and a first dibit response is determined from the first playback signal. The PN sequence at the second location is read to generate a second playback signal, and a second dibit response is determined from the second playback signal. The first and second dibit responses are arithmetically combined to generate a combined dibit response in which at least some non-linear echoes are cancelled and some echoes are enhanced, thereby isolating echoes and/or the main pulse from one another.

In a particular implementation, the PN sequence stored at the first location is stored with a polarity opposite that of the PN sequence stored at the second location. As a result, the second dibit response will invert even-order echoes with respect to the first response. In another embodiment, the PN sequence stored at the first location has the same polarity as that of the PN sequence stored at the second location, however, before storing the PN sequence at the first location, the first location is DC-erased with a first polarity and before storing the PN sequence at the second location, the second location is DC erased with a second polarity. As a result, echoes whose polarity is determined by the polarity of the DC erasure will be reversed. In general, any technique that will invert some echoes or the main pulse and not others can be used to isolate echoes and/or the main pulse from one another.

BRIEF DESCRIPTION OF THE DRAWINGS

FIG. 2 shows block diagram of a disk drive in which the present invention is implemented;

FIG. 3 is a functional block diagram illustrating a dibit extraction in accordance with the present invention;

DETAILED DESCRIPTION OF THE PREFERRED EMBODIMENTS

Figure 1:
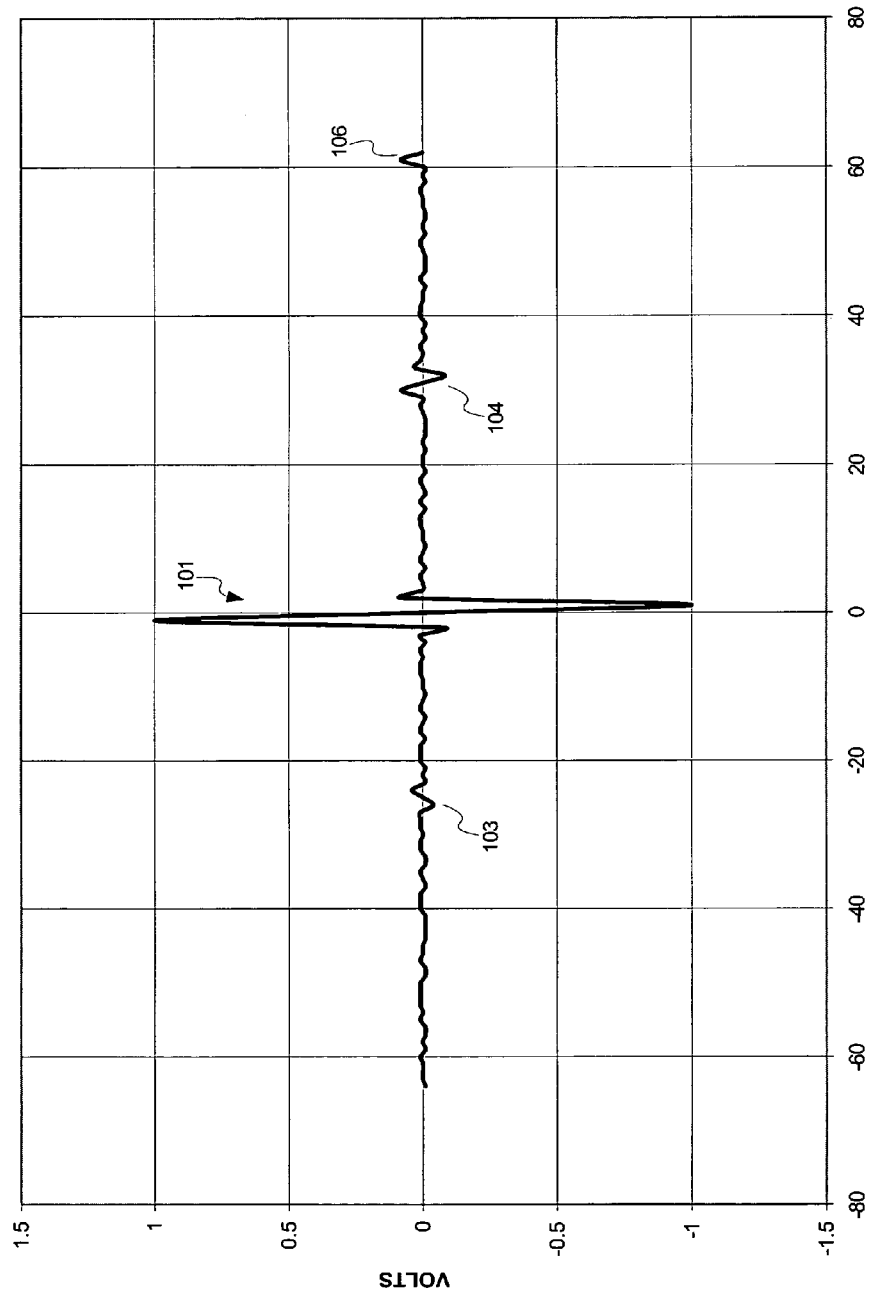
FIG. 1 shows a prior art waveform illustrating a dibit response with undesirable echoes.

The present invention is illustrated and described in terms of a system and method for characterizing a read channel in a hard disk drive, however, it should be appreciated that the invention is readily adapted to measuring and characterizing nonlinearity in a variety of communication channels. For example, in any communication channel or data recording mechanism where dibit extraction (or more generally, deconvolution with a PN input) can be used to characterize the communication channel, the present invention can be adapted to improve the quality of the dibit extraction. It is contemplated that the invention may be adapted to operate in data storage mechanisms such as tape drives, optical disk drives, and magneto-optical disk drives, as well as communication channels used for networks, telephony, and wired/wireless data communications.

An important feature of the present invention is to expand and improve the capabilities of dibit extraction by isolating and separating some of the echoes from each other. In general, a pseudorandom number (PN) sequence is generated and written to two regions of a disk drive, or to the same region, but at two different times, wherein the manner in which the PN sequence is written varies between each of the regions or times. The manner in which PN sequence is written is varied so that when the regions are read they produce alternative dibit responses (e.g., dibit responses that are complementary, at least in part, in a predictable way). The alternative dibit responses can then be arithmetically combined (e.g., by adding, subtracting, or the like) to isolate overlapping echoes associated with channel non-linearity.

In a particular example, the present invention operates to cause some of the echoes in the second region to be inverted with respect to the first region, while other echoes are not inverted. For example, by writing the pseudorandom sequence in a positive and a negative sense, extracting a dibit response from each written pseudorandom sequence, and taking a sum and/or difference of the two differently extracted dibit responses, the even and odd order echoes are isolated from each other.

In another implementation, the alternative dibit responses are produced by DC erasing the first region in a positive sense and DC erasing the second region in a negative sense before writing the PN sequence and extracting the dibit responses. Inverting the polarity of the DC erasure, inverts the polarity of the hard transition (HT) shift echo, so that it, can be separated from the magneto-resistance (MR) echo that interferes with it.

FIG. 2 illustrates in simplified form a drive system 200 in which the present invention is embodied. Disk drive system 200 includes a system processor 213 that processes requests and commands from a host computer 201 that direct drive system to perform specific behavior involving disk drive assembly 207. Examples include reading and writing data to disk drive assembly 207, providing state information such as defect tables, error status, and the like. Disk controller unit 203 includes data processing capacity as well as memory in the form of ROM 212 to generate responses to received commands and requests. The generated responses return data, state information, and/or error codes depending on the particular operation being performed.

Disk drive assembly 207 implements physical mass storage typically on a plurality of magnetic disks and read/write head electronics for transferring data with the disks. Disk drive assembly 207 typically includes read channel hardware 205 for preprocessing and amplifying data read from the magnetic media as well as a spin motor for spinning the disks, and voice coil motor (VCM) for positioning the read/write head electronics at specific locations with respect to the disk surface(s). Servo control 208 generates drive signals that control the VCM and/or spin motors.

In normal operation, host 201 sends write commands and data via controller 203 to write data onto the disks as well as read commands to retrieve previously written data from disks within disk drive assembly 207. On both read and write operations the data transmitted from the host 201 to the disk controller 203 includes an indication of a specific location or set of locations on the disk drive assembly that contains the data that is to be accessed. The data that is exchanged through disk controller 203 is typically buffered in buffer memory 204 that is accessible via memory controller 209 and subsequently transmitted to disk assembly 207 or host 201. In place of or in addition to buffer memory 204, a cache memory may be implemented by appropriate changes (e.g., tag management, hit/miss detection, and the like) to memory controller 209. Host 201 typically comprises a data processing device such as a personal computer, server, workstation or the like that requires access to bulk data storage capabilities of disk drive assembly 207.

When characterizing or testing disk drive assembly, host 201 may comprise a channel characterization system or tester that provides specific commands and data to cause the disk drive assembly to perform evaluation functions that may not occur in normal operation. These evaluation functions may include activities that extract a dibit response in accordance with the present invention. Alternatively or in addition, a channel characterization component 214 may be included within the disk controller 203, or may be implemented as software/firmware processes in system processor 213. By providing an on-board component 214 the channel characterization can be performed as a built-in-self test, or otherwise performed continuously or periodically to fine tune performance of the disk drive assembly. The channel characterization component 214 provides compensation instructions and/or information that are used by the read/write functions implemented by system processor 213 to alter the manner in which read/write functions are performed so as to compensate for non-linearity identified by component 214.

FIG. 3A and FIG. 3B are functional block diagrams illustrating alternative dibit extraction techniques in accordance with the present invention. In FIG. 3A and FIG. 3B, $a_k$ is a maximal length pseudorandom sequence, x(t) is the corresponding signal being written to the disk recording surface (e.g., the signal driving the write head), $y_k$ is the sampled playback signal presented by the read channel 205, and $d_k$ is the sampled extracted dibit response. FIG. 3A illustrates extracting a first alternative dibit response $d^+_k$ when the pseudorandom sequence is written in a positive sense, designated $+a_k$ is used, whereas FIG. 3B illustrates extracting a second alternative dibit response $d^-_k$ when the pseudorandom sequence is written in a negative sense, designated $-a_k$.

The positive dibit can be computed as $$d_k^+ = idft\left(\frac{dft(y_k^+)}{dft(+a_k)}\right)$$

and the negative dibit is given by $$d_k^- = idft\left(\frac{dft(y_k^-)}{dft(-a_k)}\right)$$

A more practical implementation of dibit extraction involves cross correlating the length N input PN sequence with the output of the channel, $$r_{ay}(k) = \sum_{n=0}^{N=1} y_n a_{n+k}$$

It can be shown that $r_{ay}(k)=Cd_k+D$ where C and D are constants and $d_k$ is the extracted dibit response. When mean($y_k$)=0 (which is typically true), then D=0 and $r_{ay}(k)$ is simply a scaled version of the dibit response. Since the amplitude of the input sequence is generally unknown, this scaling is unimportant.

Figure 4:
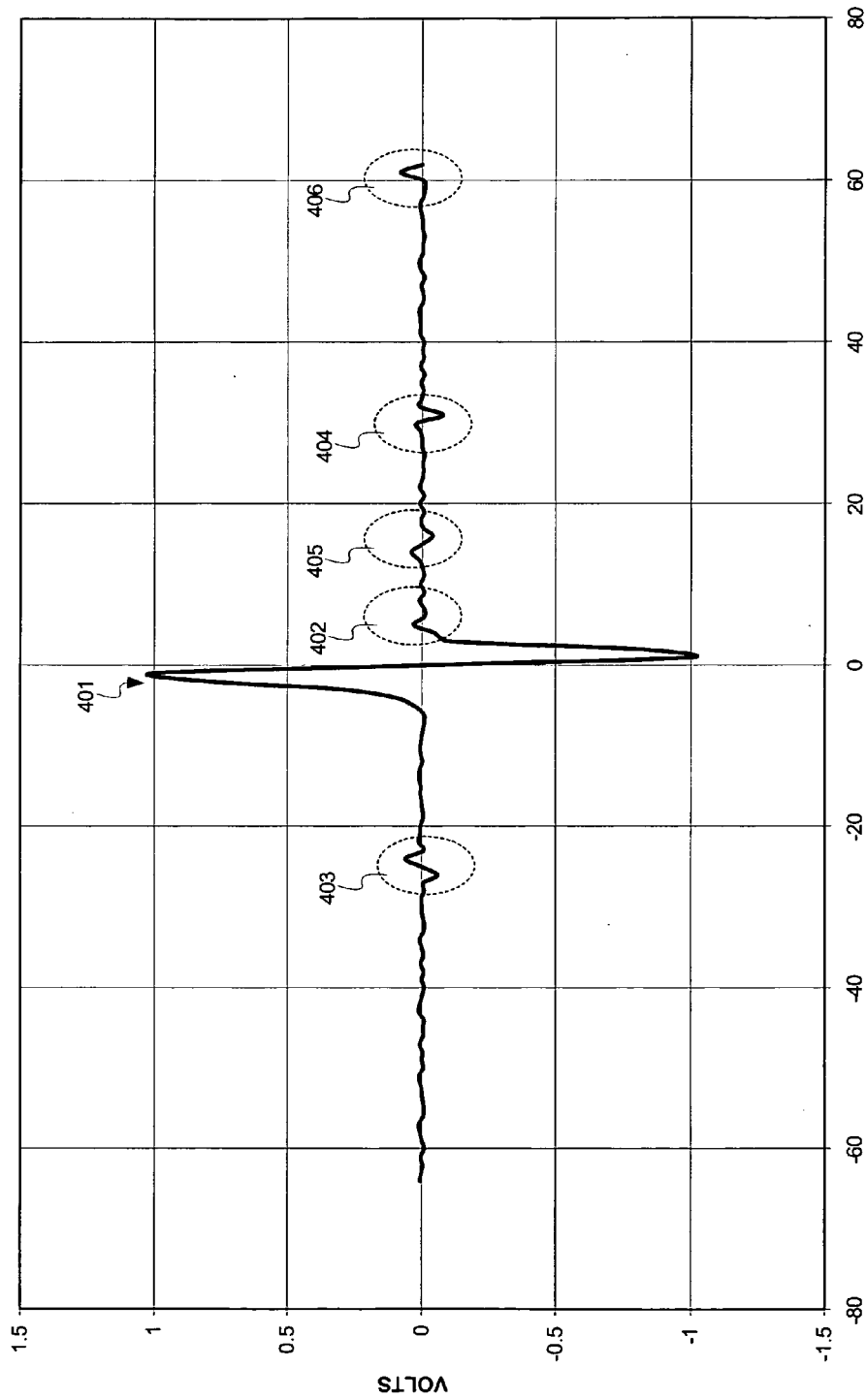
FIG. 4 illustrates an exemplary dibit response wave form produced in accordance with the present invention.
Figure 5:
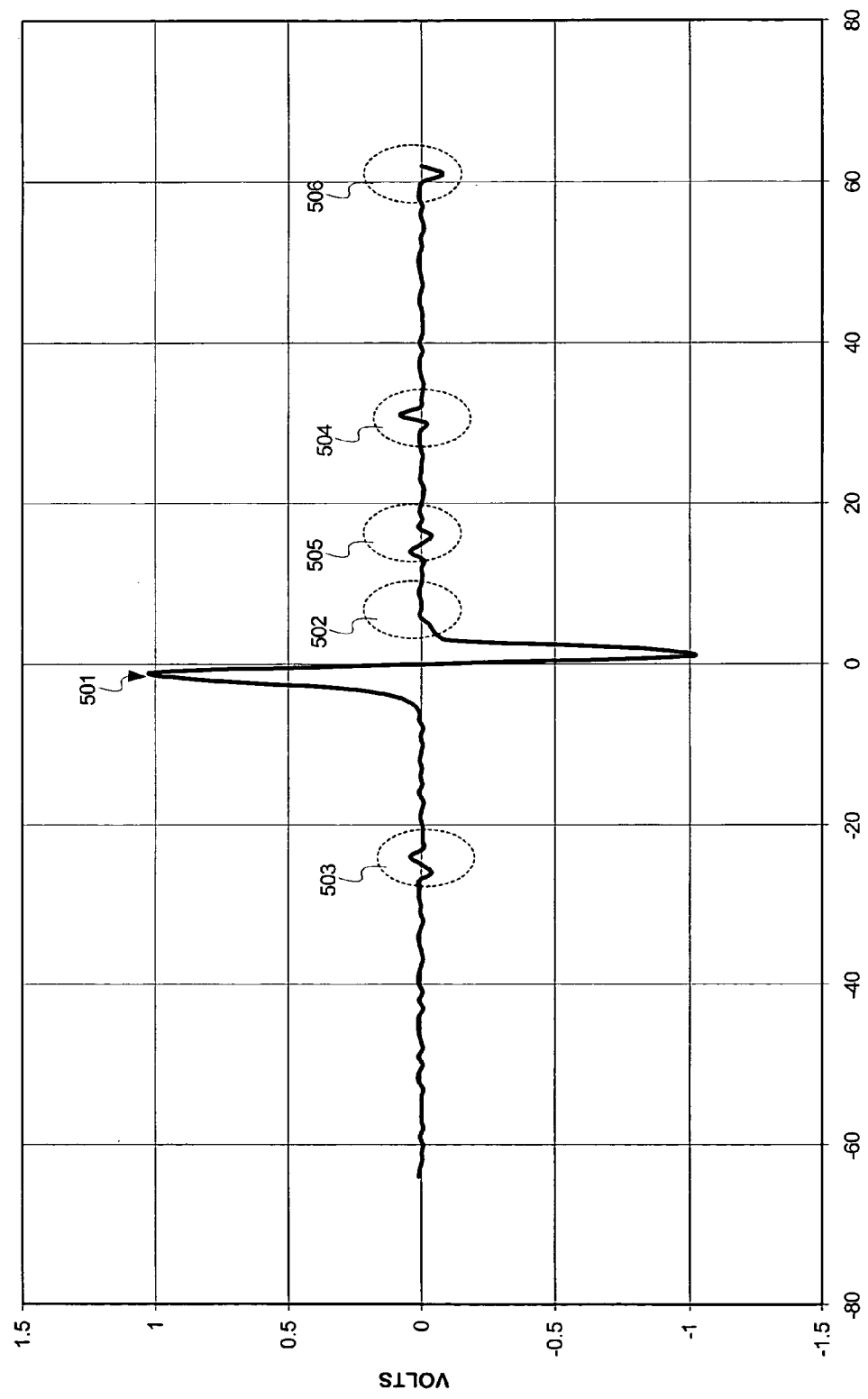
FIG. 5 illustrates an alternative dibit response wave form produced in accordance with the present invention.

FIG. 4 illustrates a simulated plot of a first alternative dibit response $d^+_k$ extracted from a positively written pseudorandom sequence +$a_k$ and FIG. 5 illustrates a simulated plot of a second alternative dibit response $d^-_k$ extracted from a negatively written pseudorandom sequence −$a_k$. The odd order echoes include an echo 401, 501 associated with the main dibit response, an echo 403, 503 associated with a non-linear transition shift (NLTS) and partial erasure occurring at −25.5 relative to the main dibit response 401, 501 and a second non-linear transition shift (NLTS2) occurring at +15. The even order echoes shown in FIG. 4 and FIG. 5 include echo 402, 502 associated with magnetoresistance (MR) asymmetry occurring at +5.5, and echo 404, 504 associated with a hard transition at +30.5 and an MR asymmetry echo at +31.5. It can be seen in FIG. 4 and FIG. 5 that some of the echoes interfere with each other which makes estimating the echo magnitude difficult or impossible.

Even order echoes 402 and 404 for $d^-_k$ in FIG. 4 are opposite in sign compared to the corresponding even order echoes 502 and 504 in $d^+_k$ shown in FIG. 5 because when the −$a_k$ sequence is deconvolved from the pseudorandom playback sequence to extract the dibit response, the minus sign negates the even order echoes and reverses the negation for the odd order echoes.

Figure 6:
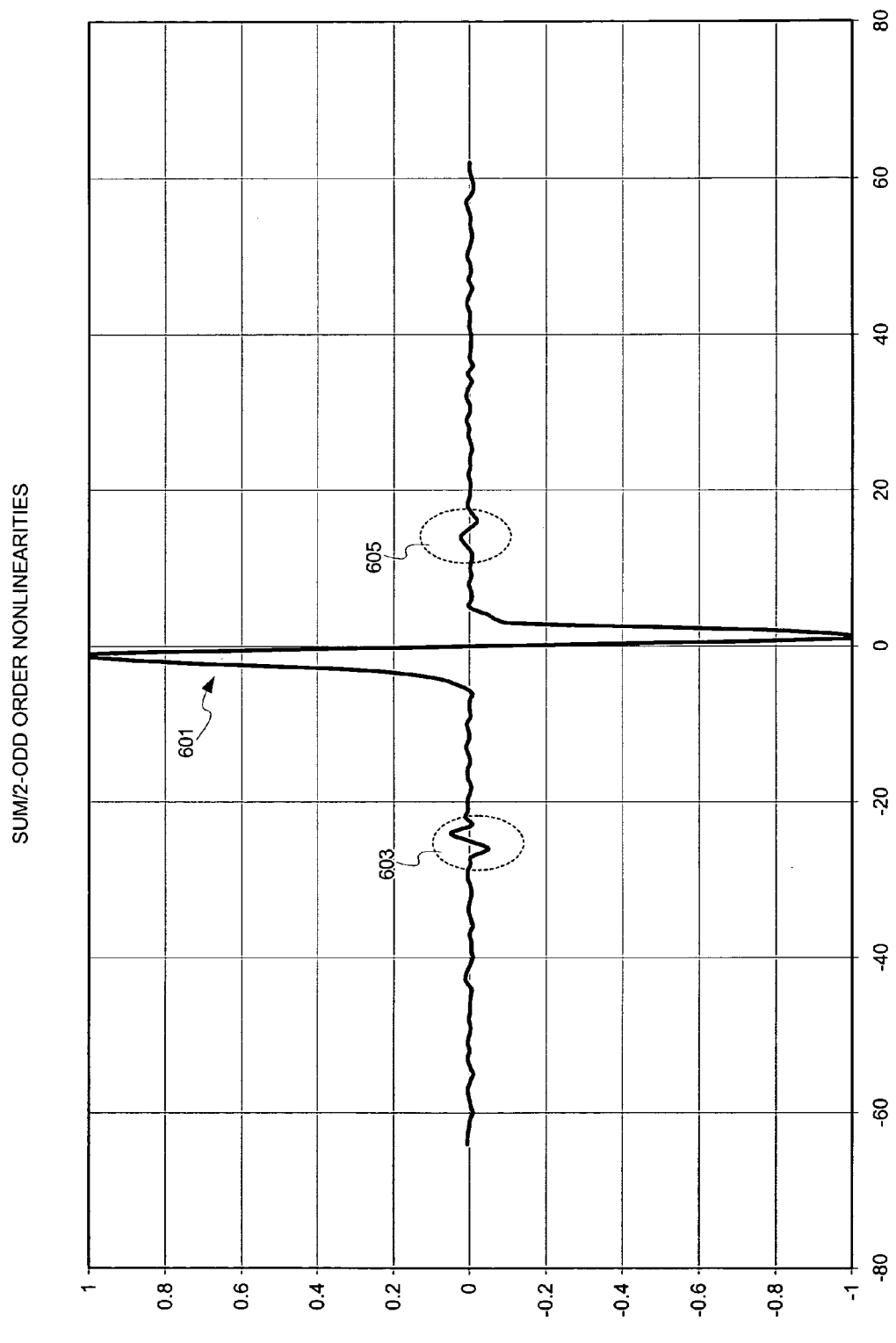
FIG. 6 illustrates a waveform derived by adding the dibit responses of FIG. 4 and FIG. 5.
Figure 7:
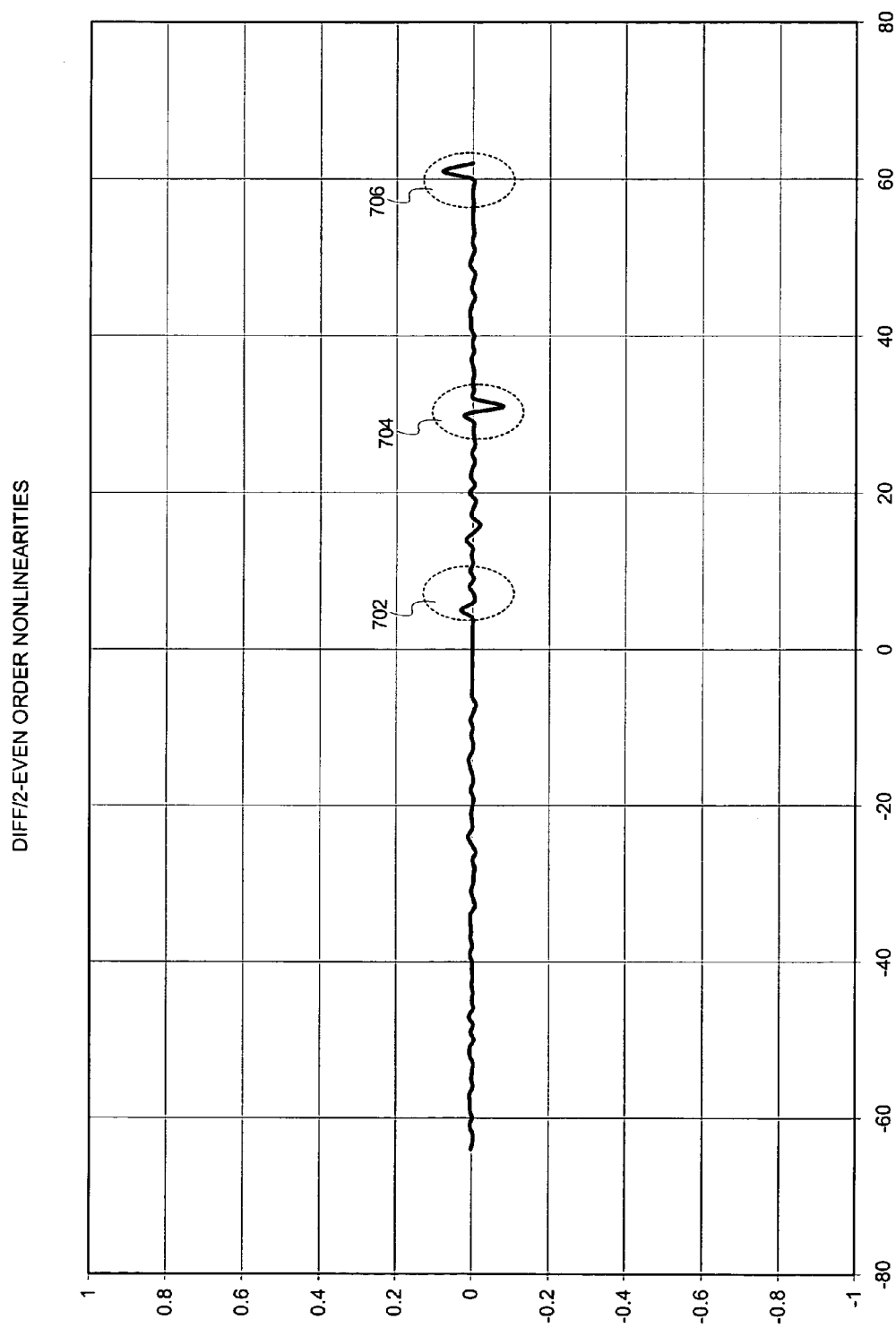
FIG. 7 illustrates a waveform derived by subtracting the dibit responses of FIG. 4 and FIG. 5.

When a difference between the two alternative dibit responses is computed:

$$(d^+_k - d^-_k)/2$$

only even order echoes 702, 704 and 706 will be present as shown in FIG. 7, while when a sum of the two alternative dibit responses is computed:

$$(d^+_k + d^-_k)/2$$

only odd order echoes 601, 603 and 605 are present as shown in FIG. 6. In computing the sum and difference between the alternatively produced dibits, the sum and difference will produce a representation of an echo that is twice the normal size. Hence, the sum/difference may be divided in half so that the derived dibit responses are on the same scale as the original dibit responses, although scaling may be handled in other manners.

Figure 8:
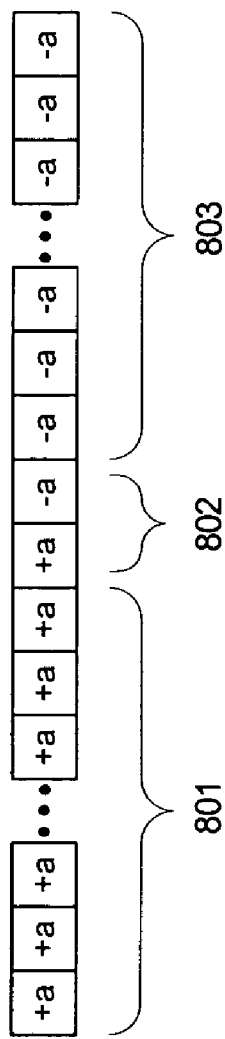
FIG. 8 illustrates a write pattern for an embodiment of the present invention.
Figure 9:
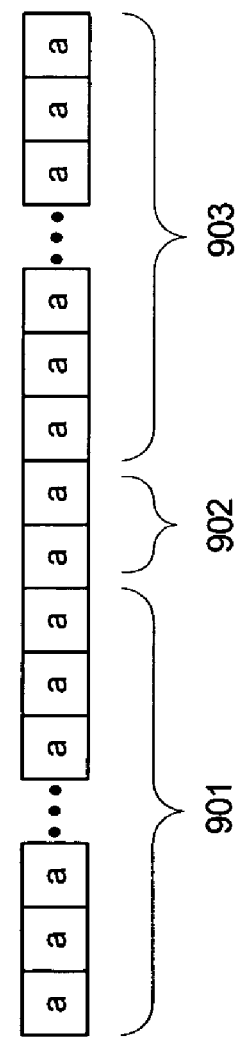
FIG. 9 illustrates a second write pattern for an alternative embodiment of the present invention.

Although the present invention can be implemented in a straightforward fashion using two separate writes and two separate reads, in a preferred implementation a single read write and single read operation are used. As shown in FIG. 8, the invention can be implemented by a single write comprising writing a block 801 of positive pseudorandom periods, labeled "+a" in FIG. 8, followed by a block 803 of negative periods, labeled "−a" in FIG. 8. The positive and negative blocks 801/803 are read in a single read operation. The two blocks are processed separately to extract the alternative dibit responses. To avoid "end effects," the blocks used for processing should start and end within a periodically written portion of the pseudorandom sequence, i.e., the data just outside the processed blocks should also be periodically extended pseudorandom sequences with the appropriate polarity. This is provided by buffer region 802.

A similar concept is applied to separating the HT shift echo from the MR asymmetry echo that interfere with each other at 504. In this implementation, a block of positive (or negative) pseudorandom sequences "a" are written on a region 901 that has been positively DC erased and then writing a block of the same positive (or negative) sequences "a" on a region 903 that has been negatively DC erased. In this case, the switch from the positive DC erased region to negative region occurs in the central portion of the buffer region 902 to avoid edge effects.

EXAMPLE 1

Estimating PW50 or T25–75 from Dibit Extractions

Measuring PW50 (the pulse width at the 50% level) or T25–75 (the transition width from the 25% to the 75% level) is a fundamental measurement for channel characterization. In order to estimate PW50 (or T25–75 for perpendicular recording) from a dibit extraction, the sampled transition response, h(kT), is obtained from the dibit response, d(kT) =h(kT)−h((k−1)T). This is accomplished by taking the cumulative sum of d(kT). This technique works well if the dibit response is essentially zero at the starting and ending points of the cumulative sum. Unfortunately, the main dibit response is normally distorted by an MR asymmetry echo 402/502 at about +5.5 with respect to the main dibit response, which results in a distorted transition response.

However, separating the even and the odd echoes isolates the main (first order) dibit response 401/501 (which appears as 601 in FIG. 6) from the (second order) MR asymmetry echo 402/502 (which appears as echo 702 in FIG. 7) at +5.5. The present invention works very well for moderate to high densities provided there are also no odd ordered NLTS echoes near the odd-order main dibit response 401/501 to distort the computed transition response. Unfortunately, there is an NLTS echo at −1.5 that is not readily separated from the main dibit response. However, the NLTS echo at −1.5 is the negative of the NLTS echo 405/505 at −25.5. It is contemplated that the echo at −25.5 could be used to subtract out the echo at −1.5, or write precompensation can be used to minimize/eliminate this echo. In contrast, the even order MR Asymmetry echo 402/502 at +5.5 can be eliminated by the differencing technique of the present invention. The transition response can then be obtained from the dibit response and from that the PW50 (or T25–75) can be estimated.

EXAMPLE 2

Separating HT Shift Echoes from MR Asymmetry Echoes for Overwrite Estimation or MR Asymmetry Estimation Although a remnant of the previously recorded signal is possible when overwriting old data, it is not likely unless the write field is marginal. In modern drives, the main source of overwrite is due to hard transition (HT) shifts. It has been shown that to estimate the overwrite ratio (OWR), it is desirable to measure the height of the HT shift echo.

At high densities, the HT shift is approximated by $$\Delta \approx 2T(V_{echo}/V_{main})$$

where T is the bit period, $V_{echo}$ is the echo and $V_{main}$ is the main dibit amplitude. The approximation tends to be better at higher densities, although the bias error in this kind of estimation can be 20–50% as described by D. Palmer, J. Coker, M. Meyer and P. Ziperovich, in "Overwrite in Thin Media Measured by the Method of Pseudorandom Sequences," IEEE Trans. On Magnetics, Vol. 24, No. 6, pp. 3096–3098, November 1988. The equalized pulse shape also has an influence on the approximation. However, a correction factor can be generated for different targets and PW50 characteristics to eliminate most of the bias.

Unfortunately, the MR asymmetry echo at +31.5 interferes with the HT echo at +30.5 (illustrated generally at 404/504). Since both of the HT and MR echoes are even order, they cannot be separated by comparing dibit responses from positively and negatively written PN sequences. However, the polarity of the HT echo can be flipped by doing two slightly different dibit extractions. A first dibit extraction is done with the pseudorandom sequence written on media that has been positively DC erased and the second dibit extraction is done on media that has been negatively DC erased. As a result, the HT echo flips, but the MR Asymmetry echo does not.

Let $d_k^{DC+}$ represent the extracted dibit when the m-sequence, $a_k$, is written on positively DC erased media and $d_k^{DC-}$ represents the extracted dibit when the m-sequence is written on negatively DC erased media. Then the MR asymmetry echo can be eliminated from the HT shift echo by computing the difference: $(d_k^{DC+} - d_k^{DC-})/2$. On the other hand, if the MR asymmetry echo is desired, the HT shift echo can be eliminated by computing the sum: $(d_k^{DC+} + d_k^{DC-})/2$. However, MR asymmetry has an isolated echo 406/506 at +61 which can also be used to detect and minimize MR asymmetry (for calibration of a MR asymmetry correction component).

It is clear that the techniques of the present invention can be used to enhance the usefulness of dibit extraction. The technique of flipping some echoes and not others allows the separation and isolation of echoes that may interfere with each other or with the main dibit response. With this approach, more accurate measurement and detection of a variety of phenomena are made possible. Dibit extraction has been used in magnetic read channels for calibration (e.g., setting write precompensation or MR asymmetry correction). Dibit extraction could also be used for manufacturing tests (e.g., measurement of overwrite and PW50). With the new capabilities taught by this invention, dibit extraction is made more useful to the hard disk drive industry.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for characterizing a read channel of a disk drive, the method comprising:
    storing a pseudorandom number (PN) sequence at a first location on a recording surface of the disk drive;
    storing the PN sequence at a second location or at the same location but at a different time on the recording surface, wherein the PN sequence is stored at the first location with a polarity opposite of that of the PN sequence stored at the second location or the same location but different time;
    reading the PN sequence at the first location to generate a first playback signal;
    determining a first dibit response from the first playback signal;
    reading the PN sequence at the second location to generate a second playback signal;
    determining a second dibit response from the second playback signal; and
    arithmetically combining the first and second dibit responses to generate a combined dibit response in which at least some non-linear echoes are isolated.

2. The method of claim 1 wherein the act of arithmetically combining comprises adding the first and second dibit responses.

3. The method of claim 2 wherein the combined dibit response presents odd order nonlinear echoes.

4. The method of claim 1 wherein the act of arithmetically combining comprises subtracting the first and second dibit responses.

5. The method of claim 4 wherein the combined dibit response presents even order nonlinear echoes.

6. A hard disk drive providing a mechanism for measuring non-linear distortion of a playback signal through dibit extraction, the hard disk drive comprising:
    a disk having a recording surface;
    a read/write head in proximity with the recording surface and operable to read and write data to the disk surface;
    servo mechanisms for positioning the read/write head at selected locations of the recording surface;
    a read channel for producing the playback signal responsive to a recorded block; and
    a channel characterization component coupled to the read channel and configured to extract a dibit response from the read channel and isolate at least some non-linear echoes from the main dibit response;
    wherein the channel characterization component is configured to:
    store a first maximal length pseudorandom number (PN) sequence at a first location on the recording surface;
    store the first maximal length PN sequence at a second location on the recording surface, with an opposite sense from the PN sequence at the first location;
    read the PN sequence at the first location to generate a first playback signal;
    determine a first dibit response from the first playback signal;
    read the PN sequence at the second location to generate a second playback signal;
    determine a second dibit response from the second playback signal; and
    arithmetically combine the first and second dibit responses to generate a combined dibit response in which at least some non-linear echoes are isolated, wherein the channel characterization component is configured to subtract the first and second dibit responses when arithmetically combining.

7. The hard drive of claim 6 further comprising a compensation component coupled to the channel characterization component and operable to modify at least one characteristic of the read channel to compensate for non-linear distortion based upon the extracted dibit response and isolated echoes.

8. The hard drive of claim 6 wherein the isolated non-linear echoes comprise odd-order echoes.

9. The hard drive of claim 6 wherein the isolated non-linear echoes comprise even-order echoes.

10. A method for characterizing a read channel of a disk drive, the method comprising:
    storing a pseudorandom number (PN) sequence at a first location on a recording surface of the disk drive;
    storing the PN sequence at a second location on the recording surface;
    reading the PN sequence at the first location to generate a first playback signal;
    determining a first dibit response from the first playback signal;
    reading the PN sequence at the second location to generate a second playback signal;
    determining a second dibit response from the second playback signal; and arithmetically combining the first and second dibit responses to generate a combined dibit response in which at least some non-linear echoes are isolated;
wherein the PN sequence stored at the first location has the same polarity as that of the PN sequence stored at the second location and the method further comprises:
before storing the PN sequence at the first location, DC erasing the first location with a first polarity; and
before storing the PN sequence at the second location, DC erasing the second location with a second polarity.

11. The method of claim 10 wherein the act of arithmetically combining comprises adding the first and second dibit responses.

12. The method of claim 11 wherein the combined dibit response presents odd order nonlinear echoes.

13. The method of claim 10 wherein the act of arithmetically combining comprises subtracting the first and second dibit responses.

14. The method of claim 13 wherein the combined dibit response presents even order nonlinear echoes.

15. A method for characterizing a read channel of a disk drive, the method comprising:
storing a pseudorandom number (PN) sequence at a first location on a recording surface of the disk drive;
storing the PN sequence at a second location on the recording surface or at the first location but at a different time;
reading the PN sequence at the first location to generate a first playback signal;
determining a first dibit response from the first playback signal;
reading the PN sequence at the second location to generate a second playback signal;
determining a second dibit response from the second playback signal; and
arithmetically combining the first and second dibit responses to generate a combined dibit response in which at least some non-linear echoes are isolated, wherein the act of arithmetically combining comprises subtracting the first and second dibit responses.

16. The method of claim 15 wherein the combined dibit response presents even order nonlinear echoes.

17. A hard disk drive providing a mechanism for measuring non-linear distortion of a playback signal through dibit extraction, the hard disk drive comprising:
a disk having a recording surface;
a read/write head in proximity with the recording surface and operable to read and write data to the disk surface;
servo mechanisms for positioning the read/write head at selected locations of the recording surface;
a read channel for producing the playback signal responsive to the recorded block; and
a channel characterization component coupled to the read channel and configured to extract a dibit response from the read channel and isolate at least some non-linear echoes from the main dibit response, wherein the channel characterization component is configured to:
store a first recorded block comprising a plurality of positive pseudorandom periods, wherein each pseudorandom period comprises a pseudorandom number (PN) sequence of a predetermined length;
store a second recorded block comprising a plurality of negative pseudorandom periods;
read at least a portion of the first recorded block to generate a first playback signal;
determine a first dibit response from the first playback signal;
read at least a portion of the second recorded block to generate a second playback signal;
determine a second dibit response from the second playback signal; and
arithmetically combine the first and second dibit responses to generate a combined dibit response in which at least some non-linear echoes are isolated.

18. The hard drive of claim 17 further comprising a compensation component coupled to the channel characterization component and operable to modify at least one characteristic of the reach channel to compensate for non-linear distortion based upon the extracted dibit response and isolated echoes.

19. The hard drive of claim 17 wherein the isolated non-linear echoes comprise odd-order echoes.

20. The hard drive of claim 17 wherein the isolated non-linear echoes comprise even-order echoes.

21. The hard drive of claim 17 wherein the first and second recorded blocks are contiguous on the recording surface.

22. The hard drive of claim 17 wherein the first and second blocks are separated on the recording surface by a buffer region, wherein the buffer region comprises a positive PN sequence adjacent to the first recorded block and a negative PN sequence adjacent to the second recorded block.

23. A hard disk drive providing a mechanism for measuring non-linear distortion of a playback signal through dibit extraction, the hard disk drive comprising:
a disk having a recording surface;
a read/write head in proximity with the recording surface and operable to read and write data to the disk surface;
servo mechanisms for positioning the read/write head at selected locations of the recording surface;
a read channel for producing the playback signal responsive to the recorded block; and
a channel characterization component coupled to the read channel and configured to extract a dibit response from the read channel and isolate at least some non-linear echoes from the main dibit response, wherein the channel characterization component is configured for:
positively DC erasing a first region on the recording surface;
negatively DC erasing a second region on the recording surface;
writing a block of pseudorandom number (PN) sequences on the first region;
writing the block of PN sequences on the second region;
reading at least a portion of the block from the first region to generate a first playback signal;
determining a first dibit response from the first playback signal;
reading at least a portion of the block from the second region to generate a second playback signal;
determining a second dibit response from the second playback signal; and
arithmetically combining the first and second dibit responses to generate a combined dibit response in which at least some non-linear echoes are isolated.

24. The hard drive of claim 23 further comprising a compensation component coupled to the channel characterization component and operable to modify at least one characteristic of the reach channel to compensate for non-linear distortion based upon the extracted dibit response and isolated echoes.

25. The hard drive of claim 23 wherein the channel characterization component is configured to add the first and second dibit responses when performing the arithmetically combining.

26. The hard drive of claim 23 wherein the channel characterization component is configured to subtract the first and second dibit responses when performing the arithmetically combining.

27. The hard drive of claim 23 wherein the isolated non-linear echoes comprise odd-order echoes.

28. The hard drive of claim 23 wherein the isolated non-linear echoes comprise even-order echoes.

29. The hard drive of claim 23 wherein the first and second regions are contiguous on the recording surface.

30. The hard drive of claim 23 wherein the first and second regions are separated on the recording surface by a buffer region, wherein the buffer region comprises a PN sequence recorded on a positively DC erased portion of the recording surface adjacent to the first region and a PN sequence recorded on a negatively DC erased portion of the recording surface adjacent to the second region.

* * * * *